US012083966B1

(12) United States Patent
MacGregor et al.

(10) Patent No.: US 12,083,966 B1
(45) Date of Patent: Sep. 10, 2024

(54) EXTERNAL HOUSING ASSEMBLY FOR MOUNTING A SENSING DEVICE INTO A SKEWED PANEL OF A VEHICLE

(71) Applicant: Amazon Technologies, Inc., Seattle, WA (US)

(72) Inventors: Mike MacGregor, Seattle, WA (US); Michael Jacob Goerz, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 17/667,884

(22) Filed: Feb. 9, 2022

(51) Int. Cl.
| | |
|---|---|
| *B60R 11/04* | (2006.01) |
| *H04N 23/51* | (2023.01) |
| *H04N 23/54* | (2023.01) |
| *B60R 11/00* | (2006.01) |
| *G01S 17/931* | (2020.01) |

(52) U.S. Cl.
CPC ............. *B60R 11/04* (2013.01); *H04N 23/51* (2023.01); *H04N 23/54* (2023.01); *B60R 2011/004* (2013.01); *B60R 2011/0043* (2013.01); *G01S 17/931* (2020.01)

(58) Field of Classification Search
CPC .............. B60R 11/04; B60R 2011/004; B60R 2011/0043; H04N 23/51; H04N 23/54; G01S 17/931
USPC .......................................................... 348/148
See application file for complete search history.

(56) References Cited

U.S. PATENT DOCUMENTS

| | | | | |
|---|---|---|---|---|
| 9,071,740 B1* | 6/2015 | Duffy | ............... | G08B 13/19619 |
| 2007/0077049 A1* | 4/2007 | Tsai | ........................ | H04N 23/57 |
| | | | | 396/91 |
| 2011/0242942 A1* | 10/2011 | Tsuzuki | ............... | G10K 11/004 |
| | | | | 367/121 |
| 2015/0327398 A1* | 11/2015 | Achenbach | .......... | H05K 7/2039 |
| | | | | 348/148 |
| 2016/0167595 A1* | 6/2016 | Kang | ..................... | H04N 23/57 |
| | | | | 348/148 |
| 2016/0307953 A1* | 10/2016 | Kono | ..................... | B60R 11/04 |
| 2017/0136963 A1* | 5/2017 | Carson | .................. | B60R 11/04 |
| 2019/0275958 A1* | 9/2019 | Yang | ..................... | B60R 11/04 |
| 2020/0096842 A1* | 3/2020 | Ramones | ............... | F16M 13/00 |
| 2021/0368074 A1* | 11/2021 | Morais Bicudo | ...... | H04N 23/58 |
| 2023/0247275 A1* | 8/2023 | Dreiocker | .............. | H04N 23/55 |
| | | | | 348/148 |

* cited by examiner

*Primary Examiner* — Matthew David Kim
(74) *Attorney, Agent, or Firm* — Thomas | Horstemeyer, LLP (57) ABSTRACT

Disclosed are various embodiments for an external housing assembly of a sensing device externally mounted on a skewed panel of a vehicle. The external housing assembly can provide ingress protection from fluids and foreign objects. In one example, the external housing assembly includes an external housing, a cylindrical conduit, a spacer, a retention nut, and a retention ring. The external housing being configured to surround an aperture of a vehicle. The cylindrical conduit attaches to the external housing, and the sensing device having a lens that is positioned within the cylindrical conduit. The spacer is positioned adjacent to the skewed panel. The retention nut is positioned adjacent to the spacer and is attached to the cylindrical conduit. A portion of the sensing device is positioned between the retention nut and the retention ring. The retention ring is attached to the retention nut.

20 Claims, 12 Drawing Sheets

EXTERNAL HOUSING ASSEMBLY FOR MOUNTING A SENSING DEVICE INTO A SKEWED PANEL OF A VEHICLE

BACKGROUND

Sensing devices can be installed in a vehicle for a variety of reasons. For example, a camera can be used to collect imagery along a road. Other examples may include sensing devices used for Light Detection and Ranging (LiDAR) applications and for training autonomous vehicle models. In some cases, the sensing device can have ingress protection to prevent fluid and foreign particles from entering an enclosure.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure involves various embodiments of a sensing device (e.g., a camera) externally mounted on a skewed panel of a vehicle. The sensing device can be externally mounted or integrated into various locations of an exterior vehicle panel. The placement location for the sensing device can be selected based on the sensing application. For example, an externally mounted vehicle camera may have a better field of view for camera-based applications located at the vehicle roof, just above the windshield. Other sensing devices may be ideally suited for different vehicle locations (e.g., integrated into the windshield, rear bumper, rear door, etc.). At these different locations, the contour of the vehicle's exterior can be skewed with respect to an oriented axis for the optical device. Thus, a hole placed on the skewed vehicle panel can create challenges for installing a sensing device. As a non-limiting example, a water seal around the lens of the sensing device can be a challenge because a first axis of the hole in the vehicle's exterior has a non-zero angle with respect to a second axis associated with the sensing device. When a lens of the sensing device is extending through the hole, gaps may exist between the lens of the sensing device and the hole because the sensing device and the skewed panel (e.g., the contour) of vehicle have different axes that are not aligned. For instance, these gaps can cause fluid leaks during weather events (e.g., rainstorms) or while washing the vehicle (e.g., pressure washing). Fluid and debris that enters an enclosure can damage or effect the performance of the sensing device.

As such, the various embodiments are directed to an external housing assembly for mounting an optical device into a skewed panel of a vehicle. The external housing assembly meets high standards of ingress protection (e.g., standard IP6K9K) with high reliability. Axisymmetric cylindrical threaded components can be arranged to apply uniform pressure on the seal elements as well as holding the external housing components firmly in-place. Thus, the various embodiments provide improved sealing characteristics that prevent the fluids and other debris from entering into an enclosure for the sensing device and from entering the interior of the vehicle. Additionally, the various embodiments provide other improvements, such as, for example, improved heat management for the sensing device, a simple tool-less installation process, and other advantages. In the following discussion, a general description of the system and its components is provided, followed by a discussion of the operation of the same.

Figure 1A:
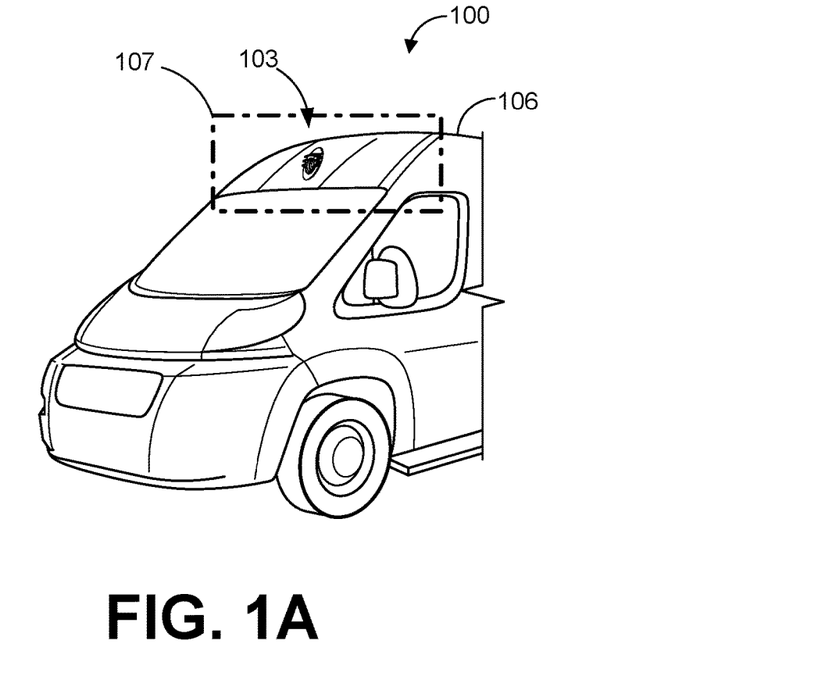
FIGS. 1A and 1B are drawings of a vehicle sensing system according to various embodiments of the present disclosure.
Figure 1B:
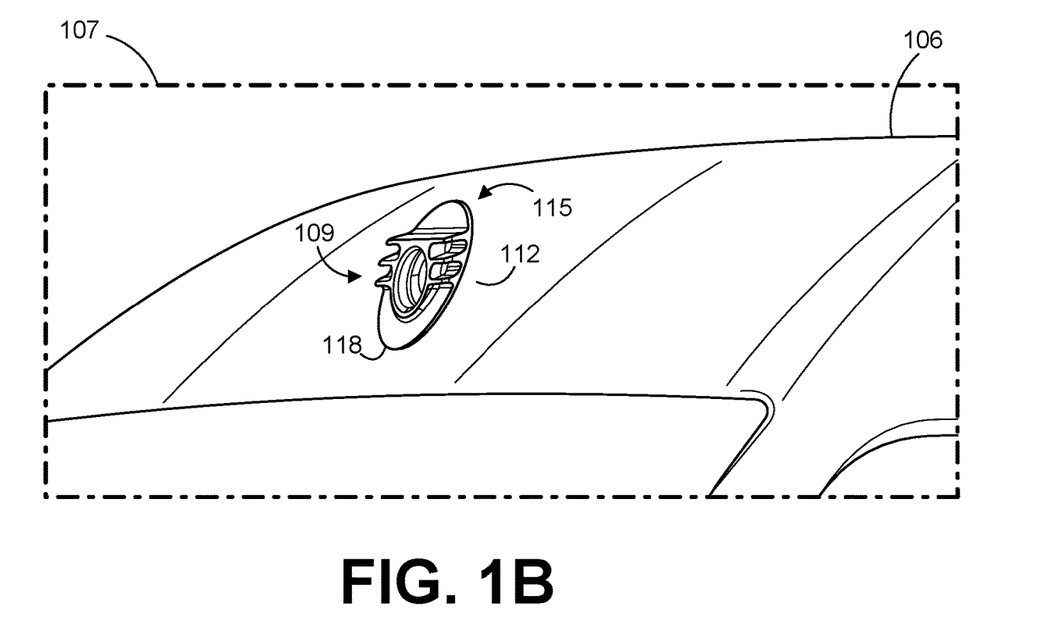

With reference to FIGS. 1A and 1B, shown are drawings of a vehicle sensing system 100. The vehicle sensing system 100 can include an external housing assembly 103, a vehicle 106, a sensing device 109 (also shown in FIGS. 2C-2D), and other suitable system components.

Figure 1C:
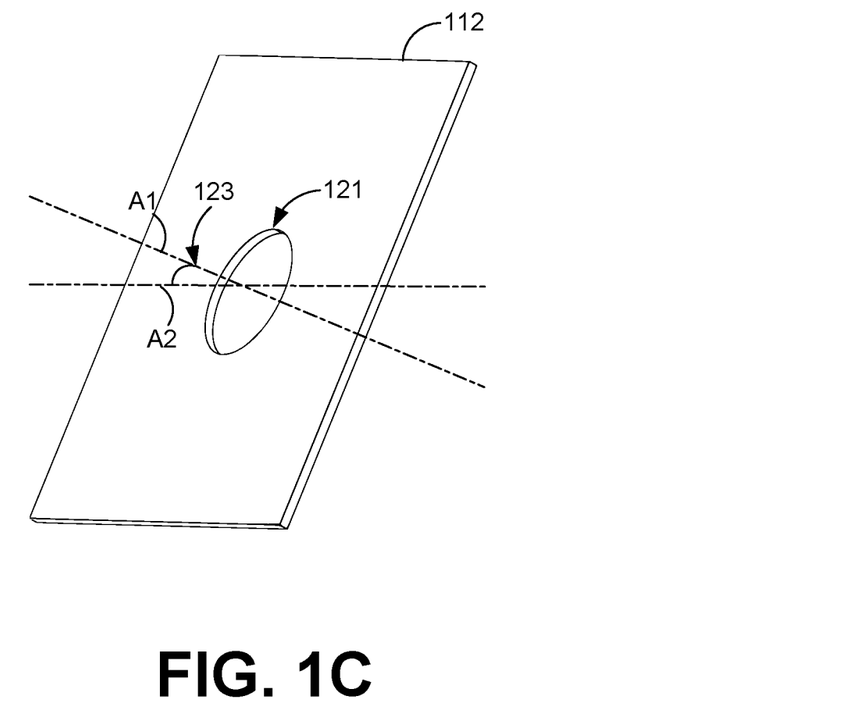
FIG. 1C is a perspective view of a skewed panel from the vehicle in FIGS. 1A and 1B according to various embodiments of the present disclosure.

FIG. 1A is a perspective view of the vehicle sensing system 100 in which the external housing assembly 103 is mounted to the vehicle 106, and FIG. 1B is an enlarged view 107 of the external housing assembly 103 from FIG. 1A. FIG. 1C is an enlarged view of a skewed panel 112 of the vehicle 106 from FIGS. 1A and 1B.

The external housing assembly 103 can be used to create a seal that prevents fluids and foreign objects from entering an aperture in the skewed panel 112 of the vehicle 106 and from entering an enclosure for the sensing device 109. In some embodiments, the external housing assembly 103 meets a high standard of ingress protection (e.g., standard IP6K9K) with high reliability. In the depicted embodiment, the external housing assembly 103 includes an external housing 115 which has a housing flange 118. The external housing 115 can be positioned around an aperture of the skewed panel 112, in which a portion of the external housing 115 can extend into the aperture. The external housing 115 can be fabricated from metal, plastic materials, a composite thereof, and other suitable materials. The external housing 115 can be fabricated using processes such as machining and molding.

The housing flange 118 can be used to surround the aperture (see e.g., mounting aperture 121 in FIG. 1C) in the skewed panel 112. In some embodiments, the housing flange 118 is bespoke to a first axis (see e.g., A1 in FIG. 1C) associated with the aperture in the skewed panel 112 and the complex geometry of the skewed panel 112. Thus, the housing flange 118 can match the contour of the skewed panel 112.

According to one embodiment, the vehicle 106 may be employed to transport people and/or cargo. Alternatively, the vehicle 106 may be used for other purposes. In the depicted embodiment, the vehicle 106 can be used for a variety of different purposes in which an externally mounted sensing device is desired. For example, an externally mounted sensing device may be desired for tracking delivery routes of delivery vans, training autonomous vehicles, collecting imagery data for maps, detecting a distance to a nearby object, and other suitable applications. In these applications, the sensing device (e.g., a camera or a LIDAR system) with advanced features and specifications may be required and can be quickly installed to the exterior surface of the vehicle 106.

Externally mounted sensing devices 109 can be preferred in some instances over integrated sensing devices. For example, oftentimes, original equipment manufacturers prefer to continue to use the same camera over a long period of time. As such, an integrated vehicle camera can become outdated. Even further, some vehicle manufacturers may not allow vehicle owners to access the integrated cameras or sensing devices for custom sensing applications.

The sensing device 109 represents, for example, a camera, a light-sensing sensor, a laser, a LiDAR system, a radar system, and/or other suitable sensing devices that are used for various sensing applications. The sensing device 109 can include a lens. The lens or other cover may comprise a cover for the sensing device 109. Such a cover may comprise, for example, of translucent materials, transparent materials, or other suitable materials. In some embodiments, the lens can cover a receiver component and/or a transmitter component of the sensing device 109. The lens can be comprised of glass, polycarbonate, and other suitable translucent/transparent materials.

The skewed panel 112 represents an exterior contour of the vehicle 106. In this manner, the skewed panel 112 represents a boundary between the outdoor environment and the ingress-protected interior. The skewed panel 112 can be fabricated from rigid materials, such as wood, fiber-glass, plastic, metal, or a composite thereof. The skewed panel 112 includes a mounting aperture 121 for the sensing device 109. As shown in FIG. 1C, a first axis A1 is orthogonal to the skewed panel 112 and is positioned at a center of the mounting aperture 121 in the skewed panel 112. The second axis A2 is associated with the orientation of the sensing device 109 that is mounted to skewed panel 112. For example, the second axis A2 can represent an orientation direction for capturing imagery for a camera or the second axis A2 can represent a targeted orientation direction for a LIDAR device or a radar device. The first axis A1 and the second axis A2 have a non-zero angle 123 with respect to each other. Since the first axis A1 and the second axis A2 are not aligned, a greater possibility exists that gaps can be formed around the perimeter of the mounting aperture 121.

Figure 2A:
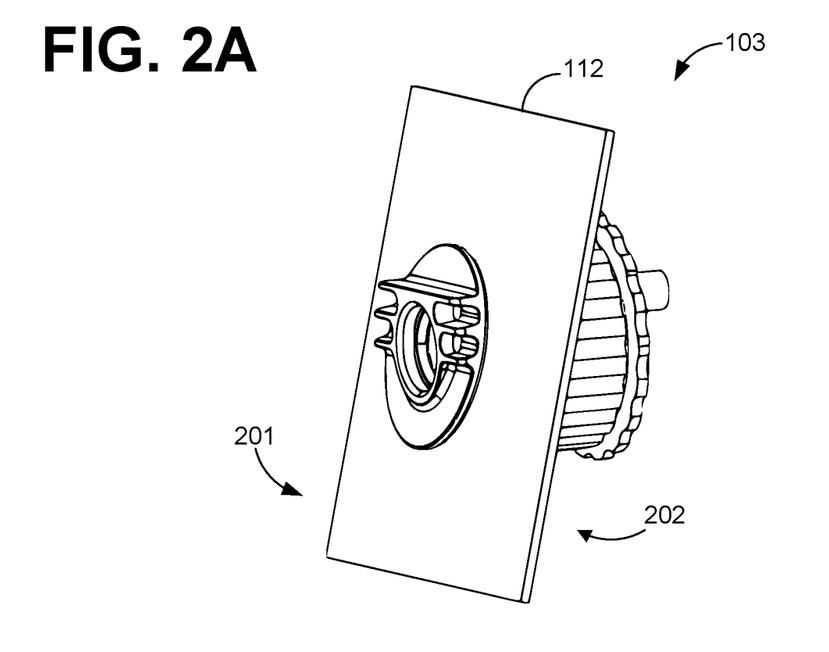
FIGS. 2A-2D are drawings of various views of an external housing assembly from FIGS. 1A and 1B according to various embodiments of the present disclosure.
Figure 2B:
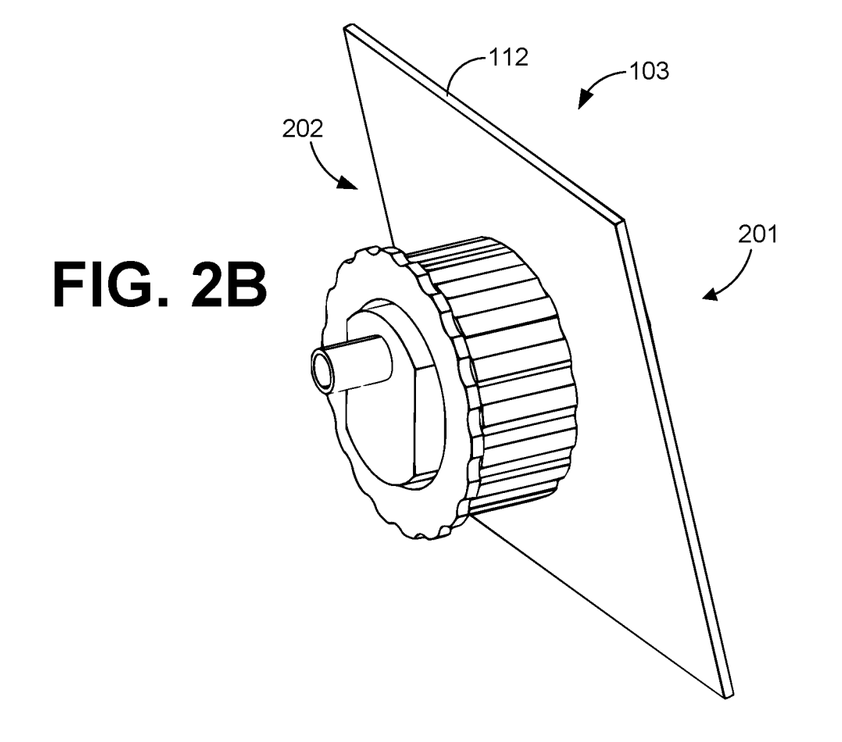
Figure 2C:
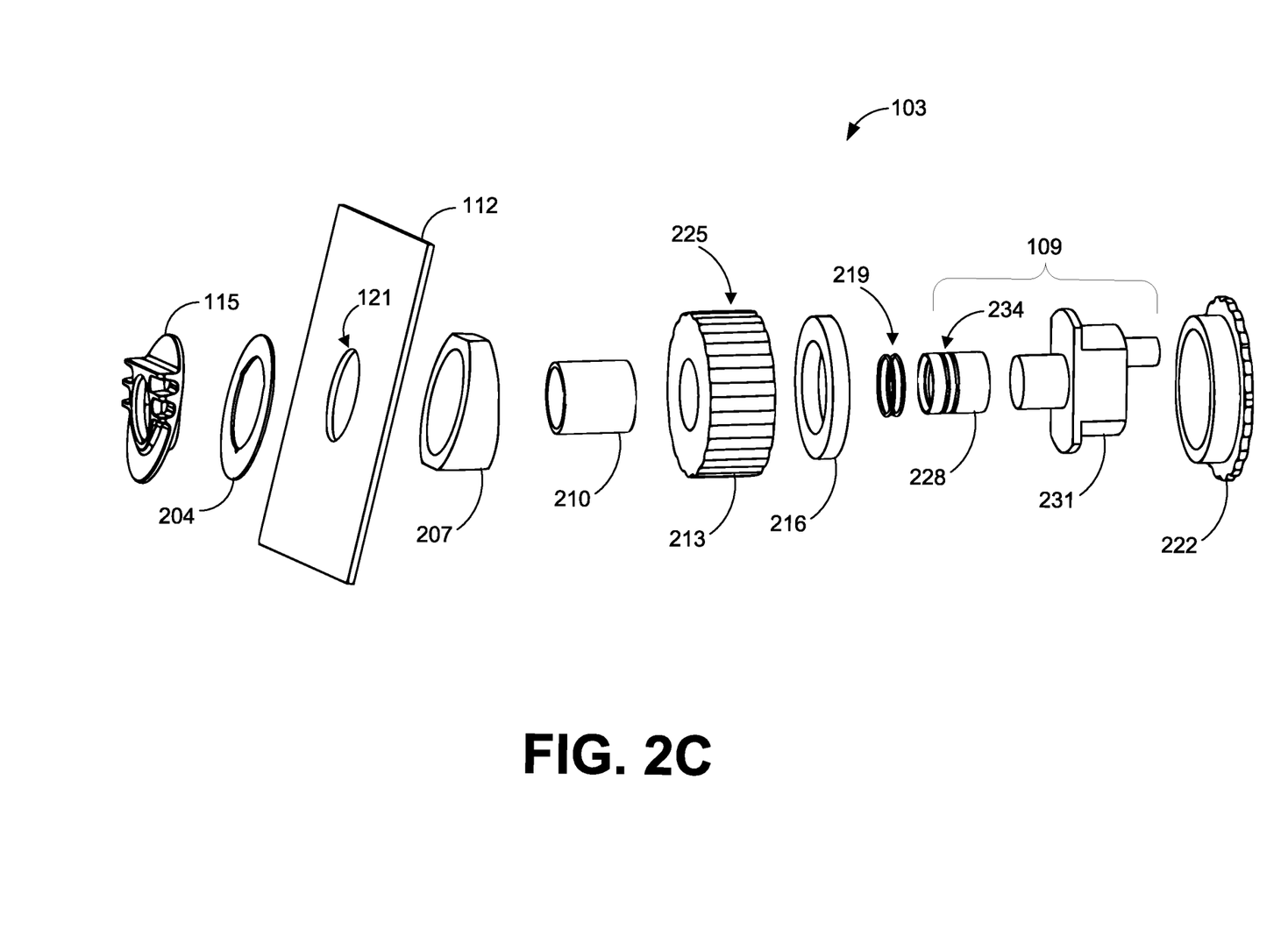
Figure 2D:
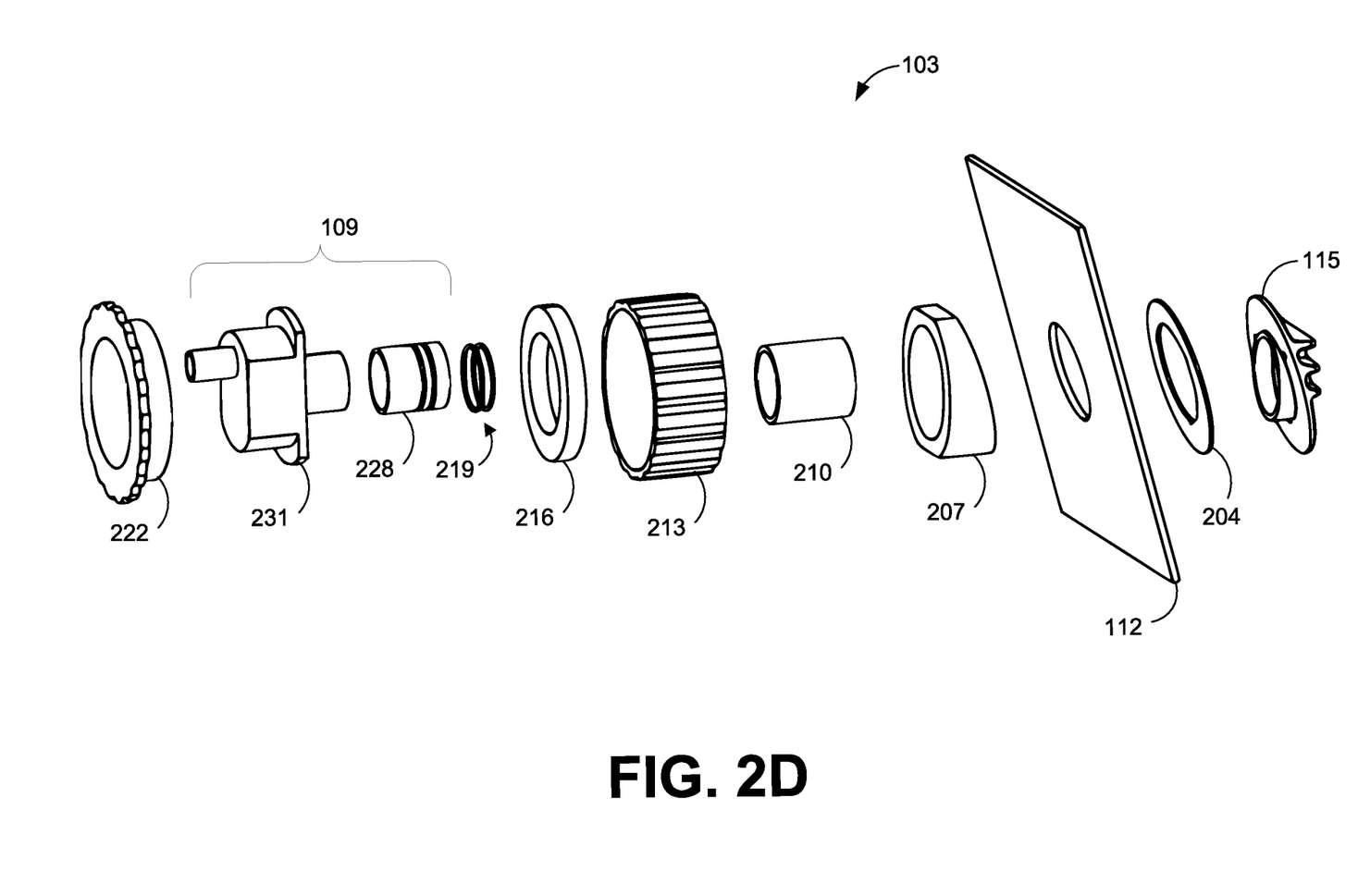

Referring next to FIGS. 2A-2D, shown are various views of the external housing assembly 103. FIG. 2A is a front perspective view of the external housing assembly 103, and FIG. 2B is a rear perspective view of the external housing assembly 103. FIG. 2C is a first exploded side view of the external housing assembly 103 from FIGS. 2A and 2B. FIG. 2D is a second exploded side view of the external housing assembly 103 from FIGS. 2A and 2B.

FIGS. 2A and 2B illustrate that the external housing assembly 103 has components on an exterior side 201 of the skewed panel 112 and on the interior side 202 of the skewed panel 112. The exterior side 201 represents outside of the exterior of the vehicle 106, and the interior side 202 represents the ingress-protected area of the vehicle 106. Thus, the skewed panel 112 represents a boundary between the outdoor environment and the ingress-protected interior.

As shown in FIG. 2C, the external housing assembly 103 includes the external housing 115, a flange seal 204, the skewed panel 112, a first spacer 207, a cylindrical conduit 210, a conduit retention nut 213, a second spacer 216, o-rings 219, the sensing device 109, the conduit retention ring 222, and other suitable components.

The flange seal 204 facilitates a fluid seal between the external housing 115 and the skewed panel 112. The flange seal 204 can be made from sheet adhesive (e.g., die-cut acrylic foam type adhesive). The flange seal 204 can be molded or die-cut elastomeric (e.g., natural rubber, silicone).

In some embodiments, the flange seal 204 can be ring-shaped with a central opening, which a portion of the sensing device 109 can extend through. In one embodiment, the flange seal 204 has a uniform thickness normal to the housing flange 118 of the external housing 115. Additionally, the flange seal 204 includes multiple recesses (e.g., cut-outs, cavities) along the inner diameter. The recesses can be used for placing the flange seal 204 in a particular orientation against the housing flange 118 of the external housing. In some embodiments, the flange seal 204 may have a non-zero offset between a first flange axis of the inner diameter of the flange seal 204 and a second flange axis of the outer diameter of the flange seal 204. Thus, the recesses in combination with the raised protrusions of the housing flange 118 can be useful for orienting the flange seal 204 properly on the housing flange 118.

The first spacer 207 can positioned within the skewed panel 112 and the conduit retention nut 213. The first spacer 207 can include a first side, a second side, and a first spacer opening. In one embodiment, the first side of the first spacer 207 is constructed to have an angle relative to a center axis of the first spacer 207 such that the first side abuts against the skewed panel 112. The second side of the first spacer 207 can be perpendicular (e.g., vertical) to the second axis A2 associated with the sensing device 109 orientation. As such, the first spacer 207 can be used to normalize the non-zero angle between the first axis A1 and the second axis A2 for subsequent components. In one example, the first spacer 207 can be a beveled bushing.

The cylindrical conduit 210 is a conduit that through which the sensing device 109 is inserted. The cylindrical conduit 210 can be inserted through the first spacer opening of the first spacer 207, the mounting aperture 121, and the flange seal 204. The cylindrical conduit 210 can be inserted into a portion of the external housing 115 and attached to the interior (of the exterior) of the external housing 115 on a first end. The conduit retention nut 213 is attached to the second end of the cylindrical conduit 210.

The conduit retention nut 213 is used in combination with the conduit retention ring 222 to restrain or support the sensing device 109 to a fixed position. The conduit retention nut 213 contacts the second side of the first spacer 207. In some embodiments, the conduit retention nut 213 includes a knurling surface 225 on the exterior surface in order to enable the fingers of an operator to gain a better grip for turning the conduit retention nut 213. The conduit retention nut 213 includes a first retention side (see e.g., FIG. 6) and a second retention side. The first retention side comprises a conduit opening (see e.g., FIG. 6) that attaches with the exterior surface of the cylindrical conduit 210. The second retention side comprising a retention opening (see e.g., FIG. 6) that has a larger diameter than the conduit opening. The retention opening is configured to receive the second spacer 216, the sensing device 109, and the conduit retention ring 222. The interior perimeter of the retention opening attaches to the conduit retention ring 222. The conduit retention nut 213 can be made from plastic materials, metal, or other suitable materials. The conduit retention nut 213 can be constructed using molding or machining processes.

The second spacer 216 can be placed within the interior of the conduit retention nut 213. The second spacer 216 can be positioned between an interior wall of the conduit retention nut 213 and the sensing device 109. In some embodiments, the second spacer 216 is a camera mount bushing. The second spacer 216 can be made from elastomer, plastic materials, or other suitable materials. The second spacer 216 can be made using molding, die-cutting, and other suitable techniques. In some embodiments, the second spacer 216 can be omitted.

The sensing device 109 can include a lens 228 (or a sensing element), a sensing device base 231 (e.g., camera base), o-rings 219, and other suitable components. The lens 228 can include grooves 234 into which the o-rings 219 are positioned. The o-rings 219 provide a fluid seal in the external housing assembly 103. The o-rings 219 thus prevent fluids from passing around the lens 228. The sensing device base 231 has a device flange that is restrained between the second spacer 216 and the conduit retention ring 222. In some embodiments, the sensing device 109 is an optical device (e.g., a camera, LiDAR system) with a lens 228. In some embodiments, the sensing device 109 is a sensing element and a sensor.

The conduit retention ring 222 is used in combination with the conduit retention nut 213 to restrain the sensing device 109. The conduit retention ring 222 can be attached to the interior perimeter walls of the conduit retention nut 213. The conduit retention ring 222 includes a ring opening through which a portion of the sensing device base 231 can extend through and connect to downstream devices (e.g., a controller).

Next, a general description of the operation of various components of the external housing assembly 103 is provided. To begin, a vehicle 106, such as a van, can be purchased by an entity to deliver packages. The entity can install the external housing assembly 103 for a camera device (e.g., sensing device 109).

During the install process, a mounting aperture 121 can be made in the vehicle's exterior. The mounting aperture 121 can be made above the windshield in order to provide an optimized field of view for the camera. The mounting aperture 121 can be located, for example, on a skewed panel 112, in which the mounting aperture 121 has a first axis A1. The camera can be oriented along a second axis A2, which has a non-zero angle with respect to the first axis A1.

The flange seal 204 can be placed against the housing flange 118 of the external housing 115. The external housing 115 can be positioned over the mounting aperture 121 on the exterior side of the vehicle 106 (e.g., skewed panel 112). A portion of the external housing 115 can be inserted into the mounting aperture 121 and the housing flange 118 surrounds the mounting aperture 121.

Next, the cylindrical conduit 210 is attached to the external housing 115. The cylindrical conduit 210 can by inserted through the mounting aperture 121 from the interior side 202 of the skewed panel 112. In one embodiment, the external housing 115 includes an interior thread and the cylindrical conduit 210 includes an external thread that facilitate a threaded engagement between the cylindrical conduit 210 and the external housing 115 by screwing the cylindrical conduit 210 into the external housing 115. The first spacer 207 can be positioned around the cylindrical conduit 210. The first spacer 207 is positioned against the interior side 202 of the skewed panel 112.

Thereafter, the conduit retention nut 213 is attached to the second end of the cylindrical conduit 210. In this respect, the conduit retention nut 213 includes an interior thread that engages an exterior thread of the cylindrical conduit 210. The second spacer 216 is placed within the interior of the conduit retention nut 213. The o-rings 219 are placed in the grooves 234 of the lens 228 and the lens 228 is inserted through the respective openings of the second spacer 216, the conduit retention nut 213, and into the cylindrical conduit 210. The flange of the camera base is positioned within the interior of the conduit retention nut 213. Then, the conduit retention ring 222 is attached to the conduit retention nut 213 in order to secure the camera to a fixed position. In some embodiments, the conduit retention ring 222 can be attached to the conduit retention nut 213 by forming a threaded engagement, where an exterior thread of the conduit retention ring 222 engages with an interior thread of the conduit retention nut 213. With the camera base positioned within the external housing assembly 103, the cables and other components can be routed from the camera through a central opening of the conduit retention ring 222 to a downstream computing device.

Figure 3A:
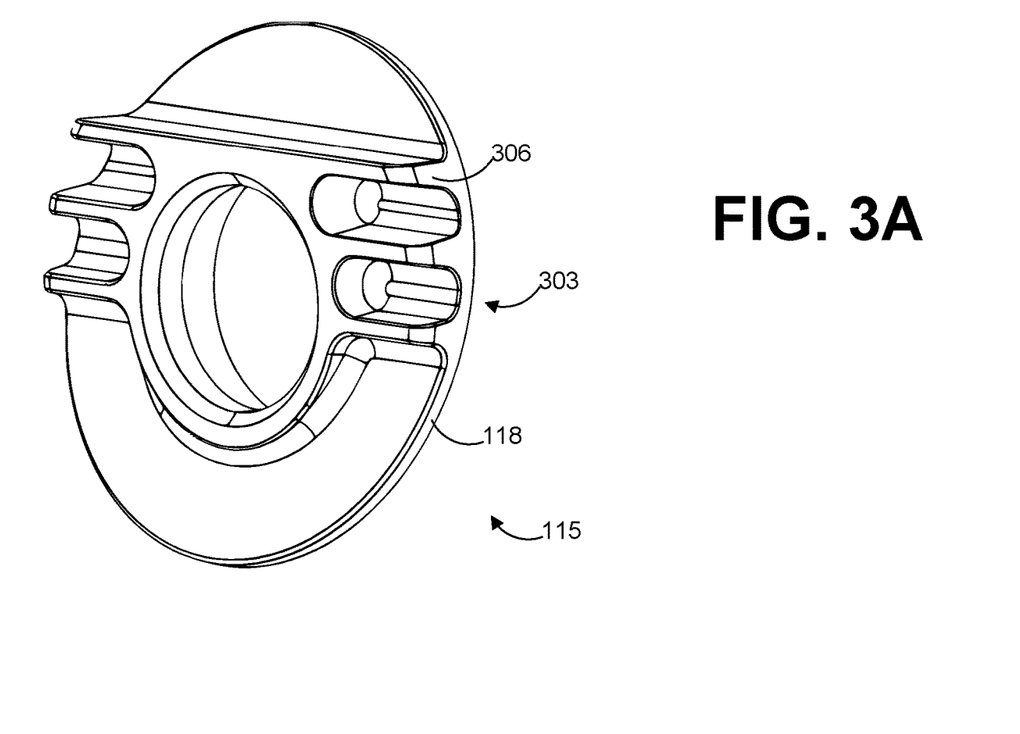
FIGS. 3A-3C are drawings of an external housing from FIGS. 1A and 1B according to various embodiments of the present disclosure.
Figure 3B:
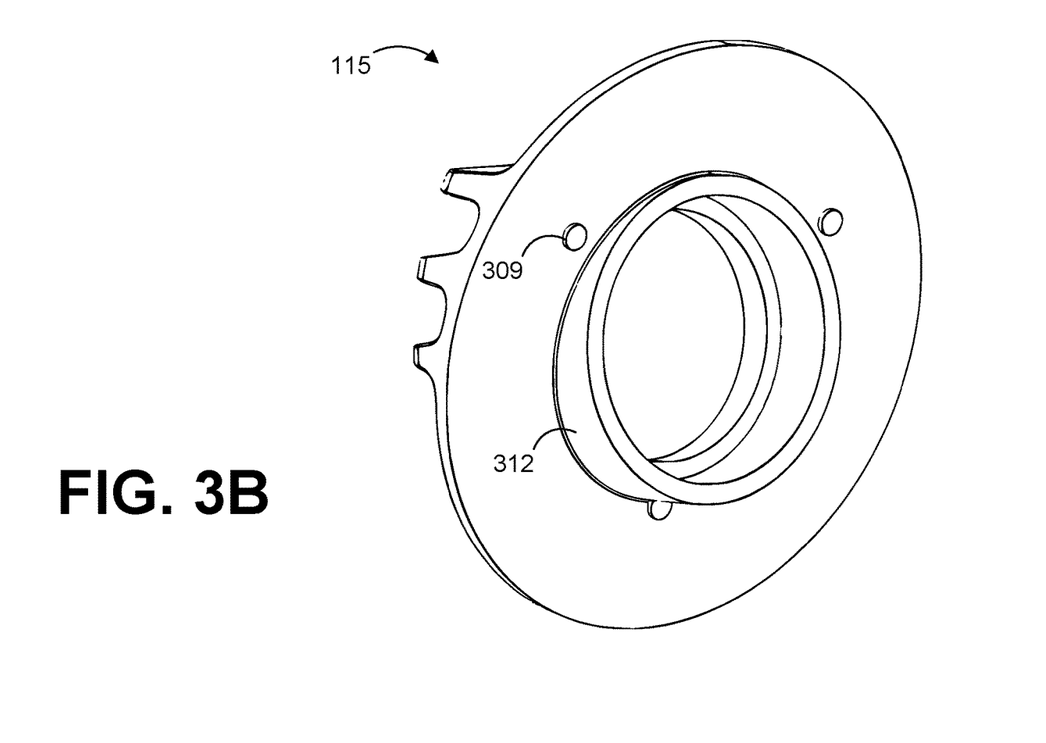
Figure 3C:
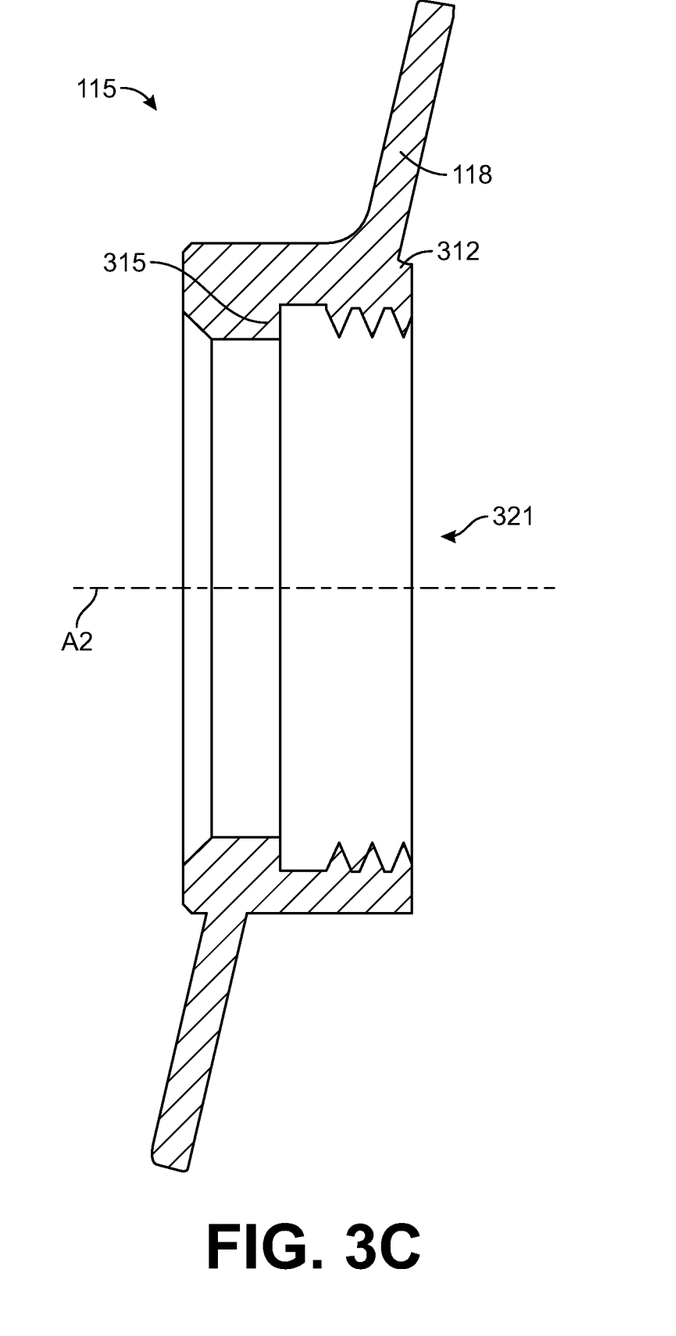

Referring next to FIGS. 3A-3C, shown are various views of the external housing 115. FIG. 3A illustrates a perspective view of a front side of the external housing 115. The front side of the external housing 115 comprises the housing flange 118, heat sink fins 303, and a horizonal shelf 306. The heat sink fins 303 provide cooling for the sensing device 109. Since components of the sensing device 109 are attached to the external housing 115, heat can be distributed to various areas of the external housing 115 such as the heat sink fins 303. Since the heat sink fins 303 are exposed to the exterior environment, air movement around the heat sink fins 303 will dissipate heat from the heat sink fins 303. The horizonal shelf 306 can also be used during installation as a reference platform for placement of a leveling device. In some embodiments, the horizonal shelf 306 can have attached (via a peel-off adhesive) a disposable bubble leveler, in which the disposable bubble leveler is pre-attached. After the leveler has been used to level the external housing 115, the leveler can be removed.

FIG. 3B illustrates a perspective view of a rear side of the external housing 115. The rear side of the external housing 115 includes three raised protrusions 309 (reference number 309 points to one of the three raised protrusions) and an external housing lip 312. The raised protrusions 309 are located on the housing flange 118 and are positioned at particular locations in order to guide the placement and orientation of the flange seal 204 onto the housing flange 118. Each raised protrusion 309 corresponds to a particular recess on the flange seal 204. The raised protrusions 309 can be keyed to the inner diameter of the flange seal 204 because the inner diameter and/or the outer diameter may not form concentric circles. Further, the external housing lip 312 can serve as an opening through which the lens 228 can enter and/or pass through. The cylindrical conduit 210 is attached to the external housing lip 312.

FIG. 3C illustrates a cross-sectional view of the external housing 115. The external housing 115 also includes a retention lip 315, internal housing threads 318, a housing opening 321, and other suitable components. The retention lip 315 provides a retention point that prevents the cylindrical conduit 210 from traveling further toward the exterior side of the external housing 115. The retention lip is axial datum with respect to the cylindrical conduit 210. Additionally, the internal housing threads 318 engage with exterior threads of the cylindrical conduit 210 to attach the cylindrical conduit 210 to the external housing 115. FIG. 3C also illustrates that the external housing lip 312 is oriented with respect to the second Axis A2.

Figure 4:
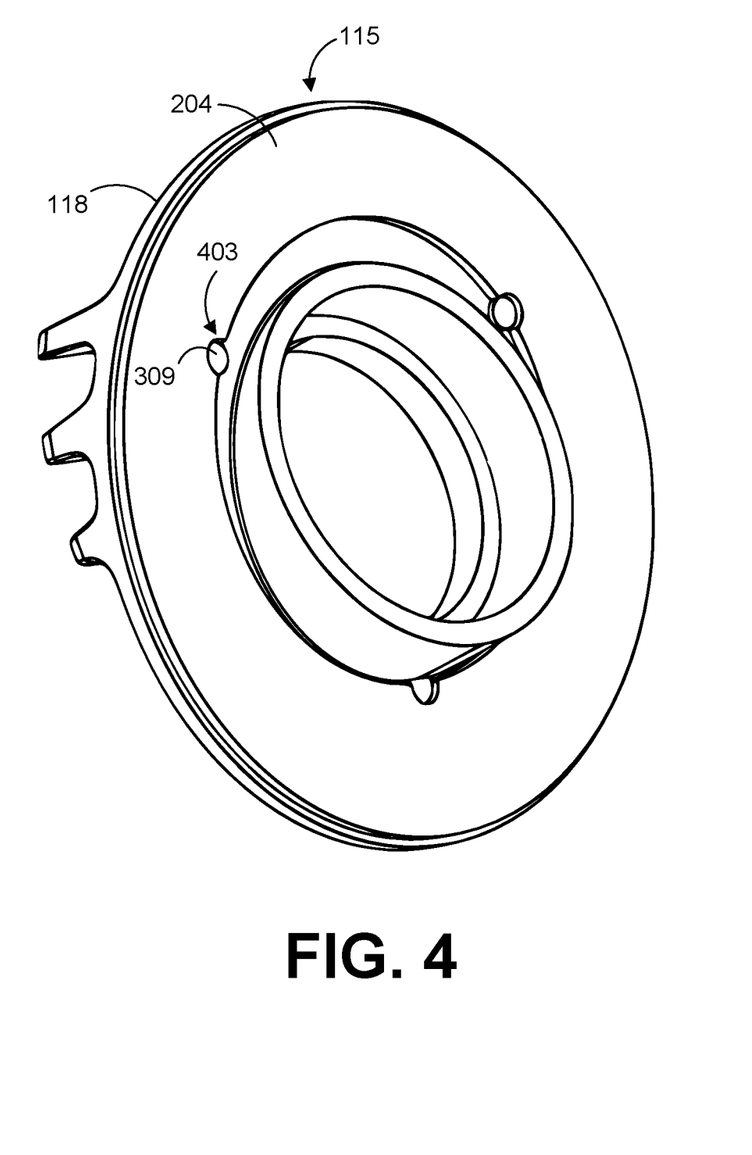
FIG. 4 is a drawing of the external housing and a flange seal from FIGS. 2A-2D according to various embodiments of the present disclosure.

Turning now to FIG. 4, shown is a rear perspective view of the interaction between the external housing 115 and the flange seal 204. As shown in FIG. 4, the flange seal 204 has recesses 403 along the inner perimeter of a respective sealing opening. The positions of the recesses 403 correspond to positions of the raised protrusions 309 on the housing flange 118 of the external housing 115. The location of the raised protrusions 309 are situated in such a way for a particular orientation of the flange seal 204 relative to the housing flange 118. As such, the raised protrusions 309 and the recesses 403 enable for a quick placement of the flange seal 204, which helps reduce the amount of time spent on the installation.

In some embodiments, the flange seal 204 may have a non-zero offset between a first flange axis of the inner diameter of the flange seal 204 and a second flange axis of the outer diameter of the flange seal 204. Thus, the recesses 403 in combination with the raised protrusions 309 of the housing flange 118 can be useful for orienting the flange seal 204 properly on the housing flange 118. The number of raised protrusions 309 and recesses 403 can vary. The locations of the raised protrusions 309 and recesses 403 can vary. Alternatively, the apertures can be created in the flange seal 204 and the apertures can correspond to the raised protrusions 309.

Figure 5:
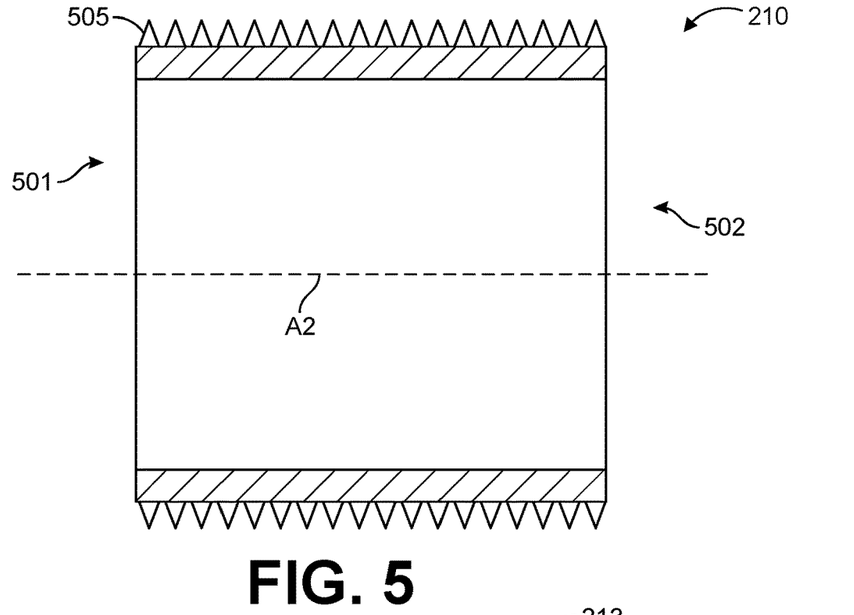
FIG. 5 is a cross-sectional view of a cylindrical conduit from FIGS. 2A-2D according to various embodiments of the present disclosure.

Moving on to FIG. 5, shown is a cross-sectional view of the cylindrical conduit 210. The cylindrical conduit 210 includes a first end 501 and a second end 502. An exterior thread 505 is located on the exterior of the cylindrical conduit 210, where the exterior thread 505 extends from the first end 501 to the second end 502. The exterior thread 505 facilitates attaching the cylindrical conduit 210 to the external housing 115 and the conduit retention nut 213. A center axis of the cylindrical conduit 210 aligns with the second axis A2.

Figure 6:
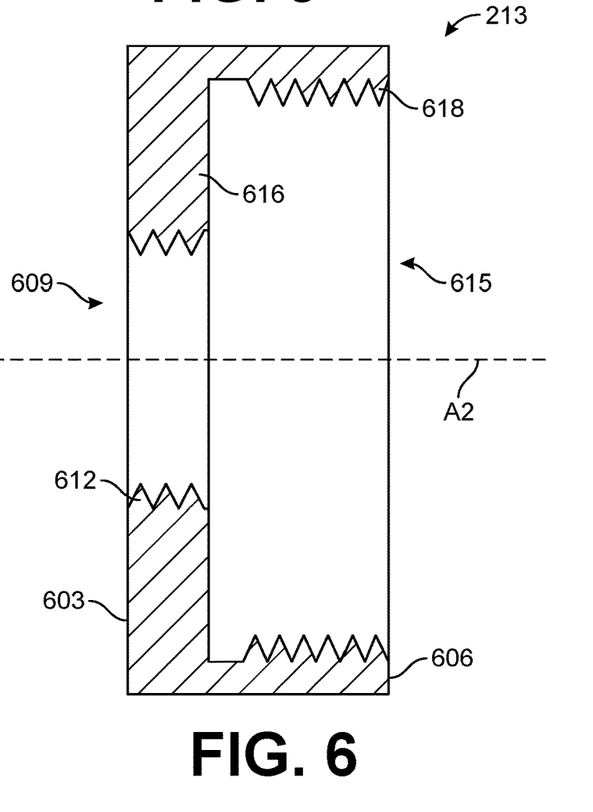
FIG. 6 is a cross-sectional view of a conduit retention nut from FIGS. 2A-2D according to various embodiments of the present disclosure.

Turning now to FIG. 6, shown is a cross-sectional view of the conduit retention nut 213. The conduit retention nut 213 comprises a first retention side 603 and a second retention side 606. The first retention side 603 comprises a conduit opening 609 for receiving and attaching to the cylindrical conduit 210. The conduit opening 609 comprises a first retention thread 612 along its perimeter. The first retention thread 612 engages with the exterior thread 505 of the cylindrical conduit 210.

The second retention side 606 comprises a retention opening 615 that has a larger diameter than the conduit opening 609. Since the retention opening 615 has a larger diameter than the conduit opening 609, the first retention side 603 has a wall 616 for receiving the second spacer 216 and/or a portion of the sensing device base 231 (e.g., a flange component of the sensing device base 231). The conduit opening 609 comprises a second retention thread 618 along its perimeter. The second retention thread 618 engages with and external thread of the conduit retention ring 222. A center axis of the conduit retention ring 222 is in alignment with the second axis A2.

Figure 7:
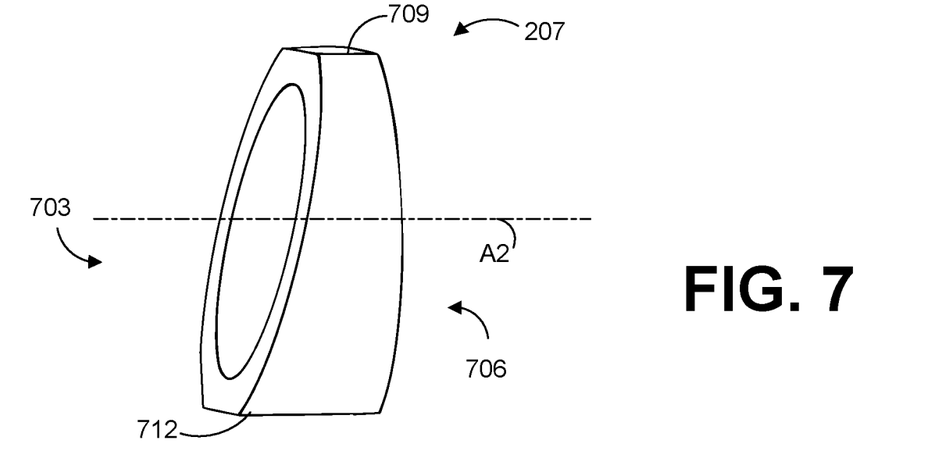
FIG. 7 is a perspective view of a first spacer from FIGS. 2A-2D according to various embodiments of the present disclosure.

Moving on to FIG. 7, shown is a perspective view of the first spacer 207 from the external housing assembly 103. The first spacer 207 includes a first side 703, a second side 706, a top side 709, a bottom side 712, and other faces. As previously described, in some examples, the first spacer 207 comprises a beveled bushing. In one embodiment, the first side 703 is perpendicular to the first axis A1 in order to correspond to the skewed panel 112, and the second side 706 is perpendicular to the second axis A2 associated with the orientation of the sensing device 109.

The top side 709 and the bottom side 712 are parallel to the second axis A2. The top side 709 and/or the bottom side 712 can be used by a leveler device during installation. The leveler device can be placed on top of the top side 709 and can be placed in contact with the bottom side 712 to ensure that the first spacer 207 is horizonal or substantially horizontal. As such, the top side 709 and/or the bottom side 712 can serve as a positioning reference.

Figure 8:
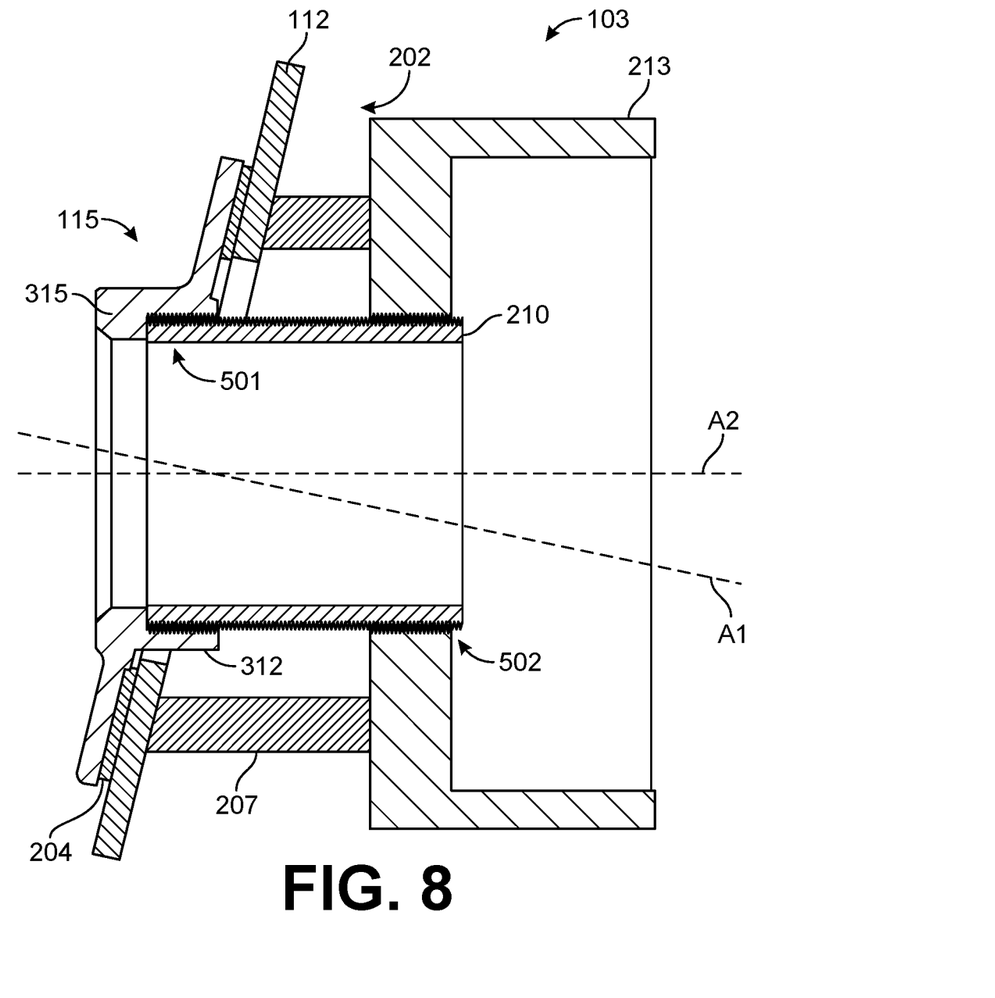
FIG. 8 is a cross-sectional view of a portion of the external housing assembly from FIGS. 2A-2D according to various embodiments of the present disclosure.

Turning now to FIG. 8, shown is a cross-sectional view of a portion of the external housing assembly 103. Some of the components of the external housing assembly 103 have been omitted in order to illustrate other aspects of the external housing assembly 103. In FIG. 8, the flange seal 204 is positioned between the external housing 115 and a surface of the skewed panel 112 around the mounting aperture 121. The external housing 115 is positioned on the mounting aperture 121 (see e.g., FIG. 1C), and the external housing lip 312 is inserted through the mounting aperture 121. In this non-limiting example, the cylindrical conduit 210 is screwed into the external housing lip 312 from the interior side 202 of the skewed panel 112. The cylindrical conduit 210 is screwed into the external housing lip 312 until the first end 501 of the cylindrical conduit 210 reaches the retention lip 315. The first spacer 207 (e.g., a beveled bushing) is placed around the cylindrical conduit 210 and positioned against the interior side 202 of the skewed panel 112. As described, a first end 501 of the cylindrical conduit 210 is screwed into the external housing lip 312. The conduit retention nut 213 is screwed onto the second end 502 of the cylindrical conduit 210. As shown in FIG. 8, the assembled components of the external housing assembly 103 form a sensing device channel 803 that is parallel to (or aligns with) the second axis A2. The lens 228 of the sensing device 109 can be inserted through the sensing device channel 803. While in the sensing device channel 803, the sensing device 109 has a field of view outside of the vehicle 106 while having a fluid seal around the mounting aperture 121. To this end, the interior surface of the cylindrical conduit 210 is smooth so as to provide a sealing surface against which the o-rings 219 are compressed.

Figure 9:
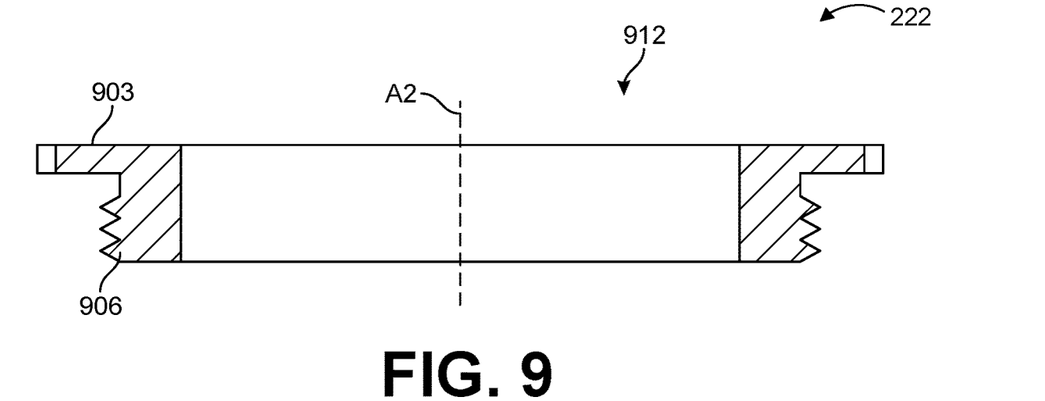
FIG. 9 is a cross-sectional view of a conduit retention ring from FIGS. 2A-2D according to various embodiments of the present disclosure.

Moving on to FIG. 9, shown is cross-sectional view of the conduit retention ring 222. The conduit retention ring 222 can be used in combination with the conduit retention nut 213 to restrain the sensing device 109. The conduit retention ring 222 comprises a retention flange 903, a ring cylinder thread 906, a ring opening 912, and other suitable components. The retention flange 903 has a larger diameter than the conduit retention nut 213. The ring cylinder thread 906 engages the second retention thread 618 as can be understood.

Figure 10:
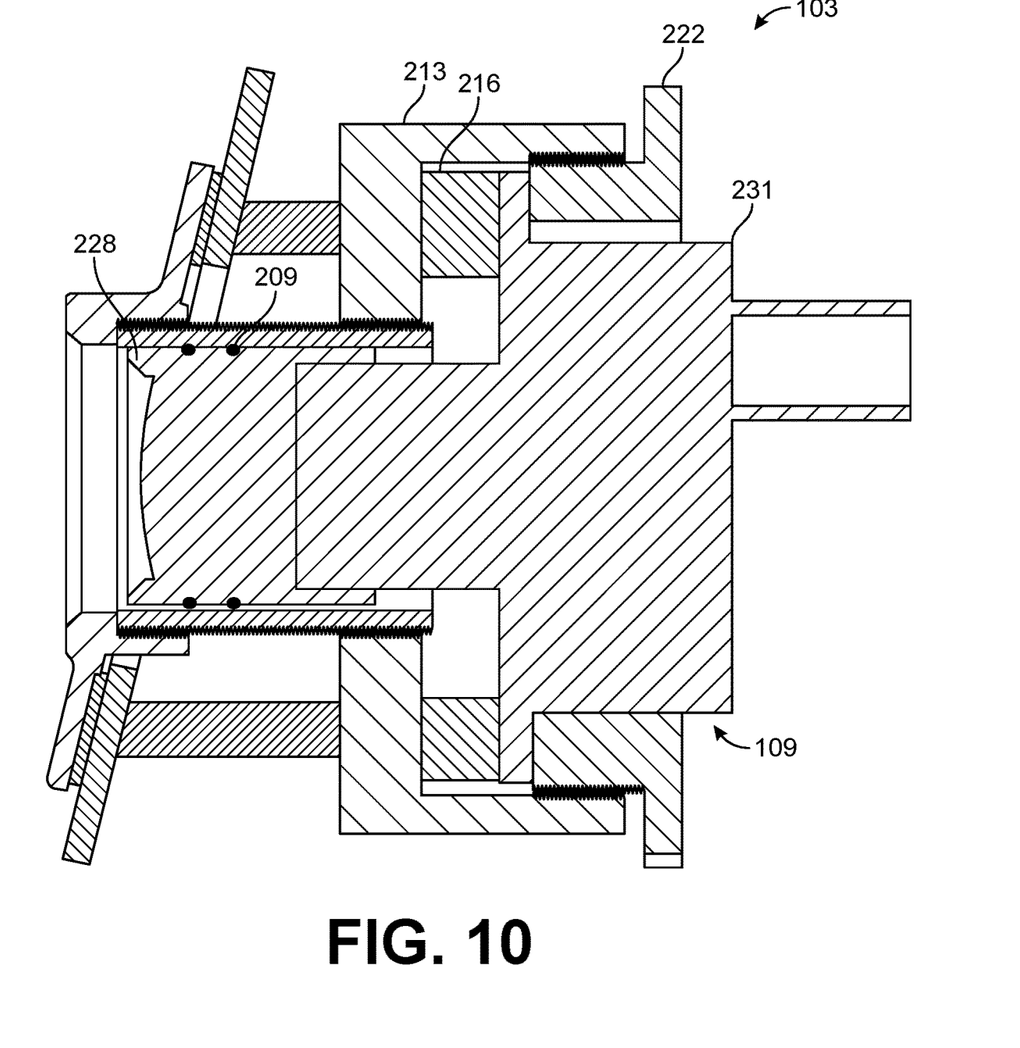
FIG. 10 is a cross-sectional view of a portion of the external housing assembly from FIGS. 2A-2D according to various embodiments of the present disclosure.

Turning now to FIG. 10, shown is a cross-sectional view of the external housing assembly 103 according to an embodiment of the present disclosure. FIG. 10 includes the components depicted in FIG. 8. Additionally, FIG. 10 includes the second spacer 216, the sensing device 109, and the conduit retention ring 222, and possibly other suitable components. The second spacer 216 is placed within the interior of the conduit retention nut 213. The lens 228 has been inserted into the sensing device channel 803. The flange of the sensing device base 231 has a larger diameter than the cylindrical conduit 210 and the conduit opening 609. Thus, the flange of the sensing device base 231 contacts the second spacer 216. The conduit retention ring 222 is screwed into the conduit retention nut 213 which will secure the flange of the sensing device base 231 from the rear side. Also, portions (e.g., cables, connectors, adapters) of the sensing device base 231 can extend out from the ring opening 912 of the conduit retention ring 222. Thus, the sensing device 109 can be connected to downstream computing devices.

Figure 11:
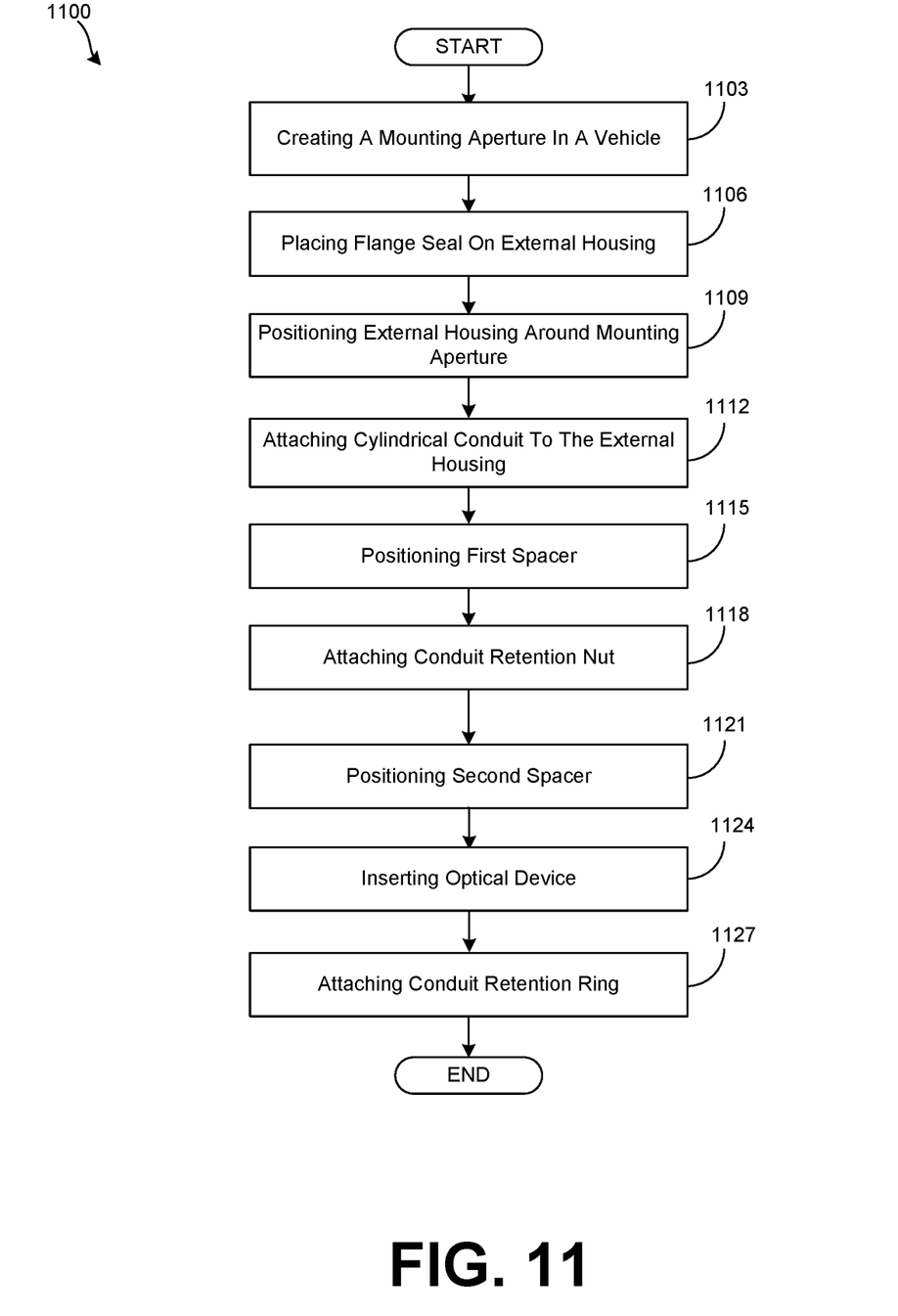
FIG. 11 is a flowchart illustrating an example process for installing the external housing assembly of FIGS. 2A-2D according to various embodiments of the present disclosure.

Referring next to FIG. 11, shown is a flowchart that provides an example process 1100 for installing the external housing assembly 103 of FIGS. 2A-2D in a vehicle 106 according to various embodiments. It is understood that the flowchart of FIG. 11 provides merely an example of the many different types of sequences or methods that may be employed for installing the external housing assembly 103 as described herein.

Beginning with box 1103, the process 1100 includes creating a mounting aperture 121 in a vehicle 106. The mounting aperture 121 can be positioned in an area that would provide an optimized field of view for the sensing device 109. In one embodiment, the mounting aperture 121 is situated on a skewed panel 112. For example, the mounting aperture 121 can be situated above the windshield of the vehicle 106 in a substantially center location. The contour (e.g., arch and/or slant) of a wall of the vehicle 106 is represented by the skewed panel 112. In one embodiment, a first axis A1 is associated with the mounting aperture 121 in the skewed panel 112 and a sensing device 109 of the external housing assembly 103 is oriented along a second axis A2. The first axis A1 and the second axis A2 have a non-zero angle 123 with respect to each other.

In box 1106, the process 1100 can involve placing the flange seal 204 onto the external housing 115. The flange seal 204 can be placed on a rear side of the housing flange 118 of the external housing 115. In some embodiments, the flange seal 204 has recesses 403 that correspond to raised protrusions 309 on the rear side of the housing flange 118. The positioning of the raised protrusions 309 on the housing flange 118 and the recesses 403 on the flange seal 204 ensure that the flange seal 204 is properly oriented relative to the housing flange 118. In some embodiments, a particular orientation of the flange seal 204 can facilitate a more effective fluid seal barrier around the mounting aperture 121.

In box 1109, the process 1100 involves positioning the external housing 115 around the mounting aperture 121 of the skewed panel 112. As such, the external housing lip 312 is inserted into the mounting aperture 121. In some embodiments, the horizonal shelf 306 can be used for leveling the external housing 115. A leveling device can be placed on the horizonal shelf 306 in order to adjust the external housing 115 to a proper horizonal orientation. For example, the external housing 115 may be rotated about the mounting aperture 121 in order to achieve a horizontal orientation.

In box 1112, the process 1100 then proceeds with attaching the cylindrical conduit 210 to the external housing 115. In some embodiments, the cylindrical conduit 210 has exterior threads 505. The cylindrical conduit 210 can be screwed into the external housing lip 312 to form a first threaded engagement at a first end of the cylindrical conduit 210. The cylindrical conduit 210 can be threaded or otherwise inserted into the external housing lip 312 until it reaches the retention lip 315. In an alternative embodiment, the cylindrical conduit 210 may be attached to the external housing 115 before the external housing 115 is placed onto the mounting aperture 121.

In box 1115, the first spacer 207 is positioned around the cylindrical conduit 210. The first side 703 of the first spacer 207 can be positioned against the interior side 202 of the skewed panel 112. The top side 709 of the first spacer 207 can be used for placing a leveling device to ensure the first spacer 207 is properly oriented relative to the mounting aperture 121.

In box 1118, the conduit retention nut 213 is attached to the cylindrical conduit 210. The conduit retention nut 213 is attached to the second end 502 of the cylindrical conduit 210 via the conduit opening 609. In one embodiment, the conduit retention nut 213 is screwed (via the first retention thread 612) into the cylindrical conduit 210 at the second end 502 to form a second threaded engagement.

In box 1121, the second spacer 216 is positioned inside the interior of the conduit retention nut 213. In one embodiment, the second spacer 216 can be a sensing device mount bushing for the sensing device 109. The second spacer 216 provides a seating surface for the sensing device 109. However, it is understood that in other embodiments, the second spacer 216 can be omitted.

In box 1124, the sensing device 109 is inserted into the external housing assembly 103. The lens 228 of the sensing device 109 can be inserted into the sensing device channel 803 along the second axis A2. In some embodiments, the lens 228 can be equipped with o-rings 219 that are placed in grooves 234 along the surface of the lens 228. The o-rings 219 are compressed between the lens 228 and an inner wall of the cylindrical conduit 210. The o-rings 219 placed in the grooves 234 and compressed between the lens 228 and the inner wall of the cylindrical conduit 210 provide for a fluid seal barrier between the lens 228 and the inner wall of the cylindrical conduit 210.

In box 1127, the conduit retention ring 222 is attached to the conduit retention nut 213. The conduit retention ring 222 is positioned onto the conduit retention nut 213 such that a portion of the sensing device base 231 can extend through the ring opening 912. A third threaded engagement can be formed between the conduit retention nut 213 and the conduit retention ring 222. A flange portion of the sensing device base 231 can be restrained between the second spacer 216 and the ring cylinder thread 906. Thereafter, the process 1100 ends as shown.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a vehicle that includes a skewed panel, the skewed panel comprises an aperture with a first axis;
a camera oriented along a second axis that has a non-zero angle with respect to the first axis, the camera comprising a lens and a camera base; and
an external housing assembly for mounting the camera on the skewed panel, the external housing assembly comprising:
an external housing that has a housing flange and an external housing lip, the housing flange matching a contour of the skewed panel, the external housing lip being oriented with respect to the second axis;
a cylindrical conduit that attaches to the external housing, the lens being positioned within the cylindrical conduit;
a beveled bushing that has a first side and a second side, the first side matching the contour of the skewed panel and contacting the skewed panel;
a conduit retention nut that contacts the second side of the beveled bushing, the conduit retention nut comprising a first retention side and a second retention side, the first retention side comprising a conduit opening that attaches to an exterior surface of the cylindrical conduit, the second retention side comprising a retention opening that has a larger diameter than the conduit opening; and
a camera retention ring that attaches to an interior perimeter of the retention opening of the conduit retention nut, a flange portion of the camera base being restrained between the camera retention ring and the conduit retention nut.

2. The system of claim 1, further comprising a camera mount bushing that is positioned between the conduit retention nut and the flange portion of the camera base.

3. The system of claim 1, further comprising a flange seal that is positioned between the housing flange and the skewed panel.

4. The system of claim 1, wherein the external housing lip comprises a portion of the external housing lip that extends into the aperture of the skewed panel.

5. The system of claim 1, wherein the exterior surface of the cylindrical conduit comprises a first threaded surface, the first threaded surface engaging a second threaded surface of the external housing, the first threaded surface engaging with a retention thread of the conduit retention nut in the conduit opening.

6. An external housing assembly for mounting a sensing device into a skewed panel of a vehicle, comprising:
an external housing that has a housing flange and an external housing lip, the housing flange being configured to surround an aperture of a skewed panel for a vehicle, the aperture of the skewed panel having a first axis that has a non-zero angle with respect to a second axis of a sensing element of a sensor, the external housing lip being oriented with respect to the second axis for the sensor;
a cylindrical conduit that attaches to the external housing, a portion of the sensing element being positioned within the cylindrical conduit;
a spacer that has a first side and a second side, the first side contacting the skewed panel;
a conduit retention nut that contacts the second side of the spacer, the conduit retention nut comprising a first retention side and a second retention side, the first retention side comprising a conduit opening, the conduit retention nut attaches to the cylindrical conduit at the conduit opening, the second retention side comprising a retention opening that has a larger diameter than the conduit opening; and
a conduit retention ring that attaches to an interior perimeter of the retention opening of the conduit retention nut, a flange portion of the sensing device being restrained between the conduit retention ring and the conduit retention nut.

7. The external housing assembly of claim 6, wherein the housing flange of the external housing comprises a heat sink fin.

8. The external housing assembly of claim 6, wherein the external housing lip comprises a retention lip that is configured to restrain the cylindrical conduit.

9. The external housing assembly of claim 6, wherein the housing flange of the external housing comprises a plurality of raised protrusions for positioning a flange seal.

10. The external housing assembly of claim 6, further comprising:
a plurality of raised protrusions on the housing flange; and
a flange seal that is positioned between the skewed panel of the vehicle and the external housing, the flange seal comprising a plurality of recesses, wherein each recess corresponds to a specific raised protrusion from the plurality of raised protrusions.

11. The external housing assembly of claim 6, wherein the second side of the spacer is perpendicular to the second axis for the sensing device, and the spacer comprises a spacer opening.

12. The external housing assembly of claim 11, wherein the spacer comprises a reference side that forms a portion of a perimeter that surrounds the spacer opening.

13. The external housing assembly of claim 6, wherein the retention opening of the conduit retention nut has a larger diameter than the conduit opening.

14. The external housing assembly of claim 6, wherein the retention opening and the conduit opening have an internal thread, the retention opening and the conduit opening being oriented with respect to the second axis.

15. The external housing assembly of claim 6, wherein the conduit retention nut comprises a knurling outer surface.

16. The external housing assembly of claim 6, wherein the conduit retention ring comprises a retention flange and a threaded ring cylinder, wherein the threaded ring cylinder engages with a threaded surface of the interior perimeter of the retention opening.

17. A method for installing an external housing assembly for a sensing device on a skewed panel of a vehicle, comprising:
positioning an external housing on a mounting aperture of the skewed panel of the vehicle, the mounting aperture having a first axis, the external housing having a housing flange that corresponds to a contour of the skewed panel and the housing flange surrounds the mounting aperture;
inserting an external housing lip of the external housing into the mounting aperture along a second axis, the second axis forming a non-zero angle with respect to the first axis;
attaching a cylindrical conduit to the external housing from an interior side of the skewed panel;

positioning a spacer around the cylindrical conduit and against the interior side of the skewed panel, the spacer having a first side that corresponds to the skewed panel and having a second side that is perpendicular to the second axis;

attaching a conduit retention nut to the cylindrical conduit;

inserting a sensing element of a sensing device into a sensing device channel formed from the external housing lip and the cylindrical conduit, wherein a portion of the sensing device is positioned within an interior of the conduit retention nut; and attaching a conduit retention ring to the conduit retention nut, the conduit retention ring and the conduit retention nut securing the portion of the sensing device.

18. The method of claim 17, further comprising placing a flange seal on a rear side of the housing flange of the external housing.

19. The method of claim 18, wherein the flange seal is placed on the housing flange by aligning a recess on the flange seal to a raised protrusion on the housing flange.

20. The method of claim 17, wherein the cylindrical conduit is inserted in such a way that a first end of the cylindrical conduit contacts a retention lip of the external housing lip.

* * * * *